(12) United States Patent
van Wyk et al.

(10) Patent No.: US 10,817,811 B2
(45) Date of Patent: Oct. 27, 2020

(54) METHODS AND APPARATUS FOR EXPOSING WORKFLOW PROCESS DEFINITIONS AS BUSINESS OBJECTS

(75) Inventors: Adriaan van Wyk, Strubensvalley (ZA); Pieter Janson, Centurion (ZA); Wynand du Toit, Little Falls (ZA); Jacobus du Preez, Snoqualmie, WA (US)

(73) Assignee: SOURCECODE TECHNOLOGY HOLDINGS, INC., Bellevue, WA (US)

(*) Notice: Subject to any disclaimer, the term of this patent is extended or adjusted under 35 U.S.C. 154(b) by 1091 days.

(21) Appl. No.: 12/117,455

(22) Filed: May 8, 2008

(65) Prior Publication Data

US 2008/0312997 A1 Dec. 18, 2008

Related U.S. Application Data

(60) Provisional application No. 60/916,706, filed on May 8, 2007, provisional application No. 60/932,270, filed on May 21, 2007.

(51) Int. Cl.
*G06Q 10/06* (2012.01)
(52) U.S. Cl.
CPC ......... *G06Q 10/06* (2013.01); *G06Q 10/0633* (2013.01)
(58) Field of Classification Search
USPC ...................................................... 705/7.27
See application file for complete search history.

(56) References Cited

U.S. PATENT DOCUMENTS

| | | |
|---|---|---|
| 5,404,294 A | 4/1995 | Karnik |
| 5,450,537 A | 9/1995 | Hirai |
| 5,535,321 A | 7/1996 | Massaro |
| 5,572,643 A | 11/1996 | Judson |
| 5,600,789 A | 2/1997 | Parker |
| 5,640,577 A | 6/1997 | Scharmer |
| 5,701,451 A | 12/1997 | Rogers |
| 5,706,434 A | 1/1998 | Kremen |
| 5,710,883 A | 1/1998 | Hong |
| 5,710,918 A | 1/1998 | Lagarde |
| 5,734,837 A | 3/1998 | Flores |
| 5,737,592 A | 4/1998 | Nguyen |
| 5,774,887 A | 6/1998 | Wolff |

(Continued)

OTHER PUBLICATIONS

Bowers S., Ludascher B. (2005) Actor-Oriented Design of Scientific Workflows. In: Delcambre L., Kop C., Mayr H.C., Mylopoulos J., Pastor O. (eds) Conceptual Modeling—ER 2005. ER 2005. Lecture Notes in Computer Science, vol. 3716. Springer, Berlin, Heidelberg (Year: 2005).*

(Continued)

*Primary Examiner* — Andrew B Whitaker
(74) *Attorney, Agent, or Firm* — K&L Gates LLP

(57) ABSTRACT

The present disclosure provides methods and apparatuses for exposing a workflow processes definition as a business object. Using the methods and apparatus herein, users can access a business object representing a workflow process definition from any system using standard database constructs. The data for the business object may be combined from a variety of existing sources and/or new data. Using the methods and apparatus a user may generate reports from the business object.

21 Claims, 14 Drawing Sheets

(56) References Cited

U.S. PATENT DOCUMENTS

| | | |
|---|---|---|
| 5,781,720 A | 7/1998 | Parker |
| 5,883,639 A | 3/1999 | Walton |
| 5,999,911 A | 12/1999 | Berg |
| 6,000,000 A | 12/1999 | Hawkins |
| 6,084,585 A | 7/2000 | Kraft et al. |
| 6,192,380 B1 | 2/2001 | Light |
| 6,199,079 B1 | 3/2001 | Gupta |
| 6,345,278 B1 | 2/2002 | Hitchcock |
| 6,460,042 B1 | 10/2002 | Hitchcock |
| 6,470,227 B1 | 10/2002 | Rangachari |
| 6,507,865 B1 | 1/2003 | Hanson et al. |
| 6,574,631 B1 | 6/2003 | Subramanian |
| 6,591,272 B1 | 7/2003 | Williams |
| 6,633,915 B1 | 10/2003 | Hashimoto |
| 6,694,362 B1 | 2/2004 | Secor et al. |
| 6,772,407 B1 | 8/2004 | Leymann |
| 6,789,252 B1 | 9/2004 | Burke |
| 6,833,847 B1 | 12/2004 | Boegner |
| 6,845,378 B1 | 1/2005 | Pauly et al. |
| 6,871,327 B2 | 3/2005 | Polk |
| 6,950,831 B2 | 9/2005 | Haley |
| 6,957,186 B1 | 10/2005 | Guheen et al. |
| 6,966,053 B2 | 11/2005 | Paris |
| 6,970,844 B1* | 11/2005 | Bierenbaum ........ G06Q 10/00 705/39 |
| 6,973,626 B1 | 12/2005 | Lahti |
| 6,978,379 B1 | 12/2005 | Goh et al. |
| 6,981,028 B1 | 12/2005 | Rawat |
| 6,983,421 B1 | 1/2006 | Lahti |
| 6,996,800 B2 | 2/2006 | Lucassen |
| 7,003,729 B1 | 2/2006 | Rajala |
| 7,024,415 B1 | 4/2006 | Kreiner |
| 7,076,411 B2 | 7/2006 | Santori |
| 7,080,066 B1 | 7/2006 | Scheurich |
| 7,111,300 B1 | 9/2006 | Salas et al. |
| 7,155,496 B2 | 12/2006 | Froyd |
| 7,155,720 B2 | 12/2006 | Casati et al. |
| 7,159,185 B1 | 1/2007 | Vedula |
| 7,159,188 B2 | 1/2007 | Stabb |
| 7,174,342 B1 | 2/2007 | Scheurich |
| 7,184,967 B1 | 2/2007 | Mital et al. |
| 7,191,391 B2 | 3/2007 | Takashima |
| 7,200,811 B1 | 4/2007 | Takashima |
| 7,203,699 B2 | 4/2007 | Bellamy |
| 7,206,998 B2 | 4/2007 | Pennell |
| 7,234,105 B2 | 6/2007 | Bezrukov |
| 7,240,323 B1 | 7/2007 | Desai |
| 7,246,344 B1* | 7/2007 | Christensen ........ G06F 8/34 717/105 |
| 7,272,820 B2 | 9/2007 | Klianev |
| 7,313,757 B2 | 12/2007 | Bradley |
| 7,353,248 B1 | 4/2008 | Kirkpatrick |
| 7,376,891 B2 | 5/2008 | Hitchock |
| 7,430,524 B2 | 9/2008 | Shah |
| 7,500,597 B2 | 3/2009 | Mann |
| 7,725,356 B2 | 5/2010 | Shah |
| 7,734,999 B2 | 6/2010 | Leung |
| 7,752,607 B2 | 7/2010 | Larab |
| 7,827,492 B2 | 11/2010 | Estrada |
| 2001/0044738 A1 | 11/2001 | Elkin et al. |
| 2001/0047279 A1 | 11/2001 | Gargone |
| 2002/0029218 A1 | 3/2002 | Bentley |
| 2002/0052769 A1 | 5/2002 | Navani et al. |
| 2002/0059264 A1 | 5/2002 | Fleming et al. |
| 2002/0091736 A1 | 7/2002 | Wall |
| 2002/0095423 A1 | 7/2002 | Dessloch |
| 2002/0120628 A1 | 8/2002 | Hitchcock |
| 2002/0188583 A1 | 12/2002 | Rukavina |
| 2002/0194219 A1 | 12/2002 | Bradley |
| 2003/0014424 A1 | 1/2003 | Sokol |
| 2003/0023953 A1 | 1/2003 | Lucassen |
| 2003/0058277 A1 | 3/2003 | Bowman |
| 2003/0101022 A1 | 5/2003 | Shah |
| 2003/0101023 A1 | 5/2003 | Shah |
| 2003/0106039 A1 | 6/2003 | Rosnow |
| 2003/0115545 A1 | 6/2003 | Hull |
| 2003/0120593 A1 | 6/2003 | Bansal |
| 2003/0145018 A1 | 7/2003 | Hitchcock |
| 2003/0149714 A1* | 8/2003 | Casati ................ G06Q 10/10 718/100 |
| 2003/0197733 A1* | 10/2003 | Beauchamp ........ G06Q 10/10 715/764 |
| 2003/0200527 A1 | 10/2003 | Lynn |
| 2003/0200533 A1 | 10/2003 | Roberts |
| 2003/0233422 A1 | 12/2003 | Csaszar |
| 2004/0002881 A1 | 1/2004 | Hu et al. |
| 2004/0039741 A1 | 2/2004 | Benson |
| 2004/0078373 A1 | 4/2004 | Ghoneimy |
| 2004/0083463 A1 | 4/2004 | Hawley |
| 2004/0113930 A1 | 6/2004 | Hawley |
| 2004/0122699 A1 | 6/2004 | Brito |
| 2004/0133876 A1* | 7/2004 | Sproule ............... G06Q 10/063 717/105 |
| 2004/0199540 A1 | 10/2004 | Nojima |
| 2004/0199863 A1 | 10/2004 | Hitchcock |
| 2004/0230404 A1 | 11/2004 | Messmer |
| 2004/0237030 A1 | 11/2004 | Malkin |
| 2004/0237040 A1 | 11/2004 | Malkin |
| 2004/0260593 A1 | 12/2004 | Abraham-Fuchs |
| 2004/0267595 A1 | 12/2004 | Woodings |
| 2004/0267897 A1 | 12/2004 | Hill et al. |
| 2005/0021348 A1* | 1/2005 | Chan ................... G06Q 10/067 706/45 |
| 2005/0044164 A1* | 2/2005 | O'Farrell et al. ........... 709/213 |
| 2005/0055634 A1 | 3/2005 | Burns |
| 2005/0080756 A1 | 4/2005 | Hitchcock |
| 2005/0086092 A1 | 4/2005 | Kowalski et al. |
| 2005/0086588 A1 | 4/2005 | McGregor |
| 2005/0125377 A1 | 6/2005 | Kotler |
| 2005/0125716 A1 | 6/2005 | Cragun |
| 2005/0172212 A1 | 8/2005 | Birsa |
| 2005/0182773 A1* | 8/2005 | Feinsmith ............ G06Q 10/10 |
| 2005/0216282 A1 | 9/2005 | Chen et al. |
| 2005/0216504 A1 | 9/2005 | Delvat |
| 2005/0223392 A1 | 10/2005 | Cox |
| 2005/0235208 A1 | 10/2005 | Arend et al. |
| 2005/0257267 A1 | 11/2005 | Williams et al. |
| 2005/0273759 A1 | 12/2005 | Lucassen |
| 2005/0283354 A1 | 12/2005 | Ouimet |
| 2006/0005140 A1 | 1/2006 | Crew |
| 2006/0020585 A1 | 1/2006 | Harvey |
| 2006/0031757 A9 | 2/2006 | Vincent |
| 2006/0036656 A1* | 2/2006 | Mercer ......................... 707/203 |
| 2006/0047672 A1 | 3/2006 | Habon |
| 2006/0064674 A1 | 3/2006 | Olson |
| 2006/0075382 A1 | 4/2006 | Shaburov |
| 2006/0080616 A1 | 4/2006 | Vogel |
| 2006/0095439 A1 | 5/2006 | Buchmann |
| 2006/0101521 A1 | 5/2006 | Rabinovitch |
| 2006/0107229 A1 | 5/2006 | Matthews |
| 2006/0119619 A1 | 6/2006 | Fagans |
| 2006/0122975 A1 | 6/2006 | Taylor et al. |
| 2006/0129906 A1 | 6/2006 | Wall |
| 2006/0150107 A1 | 7/2006 | Leung |
| 2006/0178890 A1 | 8/2006 | Marechal |
| 2006/0184410 A1 | 8/2006 | Ramamurthy et al. |
| 2006/0190310 A1 | 8/2006 | Gudla et al. |
| 2006/0195816 A1 | 8/2006 | Grandcolas |
| 2006/0225032 A1 | 10/2006 | Klerk |
| 2006/0235906 A1 | 10/2006 | Brinkmoeller |
| 2006/0248471 A1 | 11/2006 | Lindsay |
| 2006/0271390 A1* | 11/2006 | Rich ................... G06F 8/20 717/100 |
| 2007/0027733 A1 | 2/2007 | Bolle |
| 2007/0038963 A1 | 2/2007 | Moore |
| 2007/0073776 A1 | 3/2007 | Kalalian |
| 2007/0112647 A1* | 5/2007 | Borders et al. ................ 705/27 |
| 2007/0132726 A1 | 6/2007 | Gilbert |
| 2007/0139441 A1 | 6/2007 | Lucas |
| 2007/0165031 A1 | 7/2007 | Gilbert |
| 2007/0168060 A1 | 7/2007 | Nixon |
| 2007/0179641 A1 | 8/2007 | Lucas |
| 2007/0204019 A1* | 8/2007 | Martynov ............ H04L 67/02 709/223 |

(56) References Cited

U.S. PATENT DOCUMENTS

| | | | |
|---|---|---|---|
| 2007/0300236 A1 | 12/2007 | Hing | |
| 2008/0013860 A1 | 1/2008 | Blanco | |
| 2008/0071593 A1* | 3/2008 | Tanaka et al. | 705/7 |
| 2008/0294485 A1* | 11/2008 | Takeuchi | G06Q 10/00 |
| | | | 705/7.26 |

OTHER PUBLICATIONS

Written Opinion of the International Searching Authority for International Application No. PCT/US06/60470 dated Mar. 3, 2008.
Written Opinion of the International Searching Authority for International Application No. PCT/US08/58019 dated Jun. 2, 2008.
Written Opinion of the International Searching Authority for International Application No. PCT/US08/58020 dated Jun. 27, 2008.
Written Opinion of the International Searching Authority for International Application No. PCT/US08/54414 dated Jul. 25, 2008.
Written Opinion of the International Searching Authority for International Application No. PCT/US08/63087 dated Jul. 25, 2008.
Written Opinion of the International Searching Authority for International Application No. PCT/US08/64689 dated Aug. 7, 2008.
Office Action dated Jun. 23, 2010 from U.S. Appl. No. 11/556,047.
Office Action dated Jan. 28, 2011 from U.S. Appl. No. 11/556,047.
Smith et al., "Business Process Management: The Third Wave," ISBN 0929652339 Technical Excerpt Theory.
"The Enterprise Objects Framework", Enterprise Objects Framework: Building Reusable Business Objects, XX, XX, Jul. 1, 1994 (Jul. 1, 1994), pp. 1-13, XP0020478548.
The Object People: "A White Paper: TOPLink for Java", Internet Citation, 1997, XP002098153, Retrieved from the Internet: URL:http://objectpeople.on.ca/Toplink/Java/ToplinkJavaWhitepaper.pdf [retrieved on Jan. 1, 1997].
"Sun simplifies database programming with Java Blend", Internet Citation, Aug. 21, 1997 (Aug. 21, 1997), XP002098152, Retrieved from the Internet: URL:http://java.sun.com:8081/pr/1997/august/pr970821-01.html [retrieved on Feb. 16, 1999].
EP Search Report dated Mar. 18, 2011.
Cheng, An object-oriented organizational model to support dynamic role-based access control in electronic commerce, Elsevier Science B.V., 2000, pp. 1-13.
Office Action dated Oct. 14, 2009 from U.S. Appl. No. 11/556,044.
Office Action dated Aug. 18, 2008 from U.S. Appl. No. 11/556,029.
Office Action dated Mar. 16, 2009 from U.S. Appl. No. 11/556,029.
Office Action dated Sep. 3, 2009 from U.S. Appl. No. 11/556,029.
Office Action dated May 11, 2010 from U.S. Appl. No. 11/556,029.
Office Action dated Oct. 19, 2010 from U.S. Appl. No. 11/556,029.
Office Action dated May 21, 2010 from U.S. Appl. No. 11/556,023.
Office Action dated Aug. 31, 2010 from U.S. Appl. No. 11/556,040.
Office Action dated Feb. 1, 2010 from U.S. Appl. No. 11/555,996.
Office Action dated Jul. 19, 2010 from U.S. Appl. No. 11/555,996.
Office Action dated Sep. 30, 2010 from U.S. Appl. No. 11/556,016.
Office Action dated Oct. 29, 2008 from U.S. Appl. No. 11/555,968.
Office Action dated May 12, 2009 from U.S. Appl. No. 11/555,968.
Office Action dated Feb. 2, 2010 from U.S. Appl. No. 11/555,968.
Office Action dated Aug. 2, 2010 from U.S. Appl. No. 11/556,001.
Office Action dated Feb. 16, 2010 from U.S. Appl. No. 11/556,001.
Lavana, et al. "Executable Workflows: A Paradigm for Collaborative Design on the Internet", 1997, ACM, p. 1-6.
Office Action dated Nov. 10, 2010 from U.S. Appl. No. 11/556,023.
Office Action dated Jan. 24, 2011 from U.S. Appl. No. 11/556,001.
Office Action dated Feb. 2, 2011 from U.S. Appl. No. 11/556,040.
Notice of Allowance dated Feb. 25, 2011 from U.S. Appl. No. 11/556,044.
Office Action dated Mar. 23, 2011 from U.S. Appl. No. 11/556,029.
Notice of Allowance dated Apr. 4, 2011 from U.S. Appl. No. 11/556,044.
Notice of Allowance dated Mar. 23, 2011 from U.S. Appl. No. 11/556,016.
Office Action dated Mar. 25, 2011, from U.S. Appl. No. 11/556,023.
Advisory Action dated Apr. 14, 2011, from U.S. Appl. No. 11/556,040.
Office Action dated Jan. 6, 2012 from U.S. Appl. No. 11/555,996.
Office Action dated Jul. 25, 2011, for U.S. Appl. No. 11/556,029.
Office Action dated Oct. 11, 2011, for U.S. Appl. No. 11/556,047.
Office Action dated Oct. 18, 2011, for U.S. Appl. No. 11/556,023.
Office Action dated Oct. 14, 2011, for U.S. Appl. No. 11/556,040.
Notice of Allowance and Issue Fee Due dated Mar. 23, 2012 for U.S. Appl. No. 11/556,040.
Notice of Allowance and Issue Fee Due dated Apr. 11, 2012 for U.S. Appl. No. 11/556,047.
Office Action dated May 2, 2012 for U.S. Appl. No. 11/556,029.
Office Action dated Aug. 2, 2012 for U.S. Appl. No. 11/555,996.
Office Action dated Sep. 13, 2013 for U.S. Appl. No. 11/556,029.
Office Action dated Feb. 27, 2013 for U.S. Appl. No. 11/555,968.

* cited by examiner

FIG. 12

| Process Name | Folder | Number Instances | Average Duration |
|---|---|---|---|
| NewCustomerOnboarding | DenallixBP | 2 | 00:00:01:04 |
| PurchaseRequest | DenallixBP | 21 | 67:01:16:25 |
| QuoteApproval | DenallixBP | 5 | 17:11:46:37 |
| TrainingRequest | DenallixBP | 6 | 86:22:48:49 |

| Process Overview > Process Instances | | | | | | |
|---|---|---|---|---|---|---|
| Configuration \| Selected Filter | All Processes ▼ | | | | | |
| ⏮ ◀ 1 of 1 ▶ ⏭ | 100% ▼ | Select a format ▼ | Export | | | |

Process Instances Report

Process: DenallixBP\TrainingRequest

| Process Folio | Start Date △ | Finish Date | Originator | Status | Duration | Priority |
|---|---|---|---|---|---|---|
| TR1 | 11/29/2007 4:20:27 PM | | K2:DENALLIX\charles | Active | 115:06:40:15 | Medium |
| TR2 | 12/3/2007 12:05:09 PM | | K2:DENALLIX\veronica | Active | 111:10:55:33 | Medium |
| TR3 | 12/5/2007 7:00:44 PM | | K2:DENALLIX\mary | Active | 109:03:59:57 | Medium |
| TR4 | 12/22/2007 1:20:09 AM | | K2:DENALLIX\bob | Active | 92:21:40:32 | Medium |
| TR5 | 12/22/2007 1:29:36 AM | | K2:DENALLIX\Fabian | Active | 92:21:31:05 | Medium |
| TR6 | 2/1/2008 12:57:47 PM | 2/1/2008 1:03:41 PM | K2:DENALLIX\fred | Completed | 00:00:05:53 | Medium |

1302

METHODS AND APPARATUS FOR EXPOSING WORKFLOW PROCESS DEFINITIONS AS BUSINESS OBJECTS

CROSS-REFERENCE TO RELATED APPLICATIONS

The present application claim benefit to U.S. Patent Application No. 60/916,706, METHODS AND APPARATUS FOR REPRESENTING BUSINESS PROCESS INFORMATION AS BUSINESS ENTITIES, filed on May 8, 2007; and U.S. Patent Application No. 60/939,270, METHODS AND APPARATUS FOR EXPOSING WORKFLOW AND PROCESS DEFINITIONS AS BUSINESS OBJECTS, filed on May 21, 2007, the entire contents of which are incorporated herein by reference.

BACKGROUND

As the number of information sources in organizations are growing, it is becoming increasingly difficult for consumers of the information to access it in a logical and structured way that relates to the traditional business objects they find familiar within their organizations (e.g., customers, assets, vendors, staff, etc). Data from existing systems is typically made available in a technical way that requires significant technical and development skills to surface it to non-technical users in the organization. A workable mechanism is needed for non-technical users to add information within a logical business object definition without involving technical or development skills. Similarly, a workable solution is needed to allow both technical and non-technical users of data to access their information from multiple data/information sources in a structured business object like way, while still maintaining the flexibility to add additional information definitions to the existing business objects or to create new business objects from existing or new data sources without the need for complex solution development.

Existing Enterprise Application Integration (EAI) systems combined with development tools can be used to develop custom solutions which make data and information more accessible, but these solutions are hard-coded and require significant technical and development skills to maintain and change over time. Non-technical users need a workable way to change the definition of the structured data (business objects) or to add additional information sources or fields within existing business object definitions that might already exist within their organizations. For example, customer information might exist in a CRM system, ERP system and a custom issue tracking system. Existing EAI solutions assist in integrating data between these systems, but do not provide a mechanism to see a single definition of a customer as a logical business object regardless of where the information is being sourced from.

In addition, information workers are limited by the static business forms and information presented to them by the solution applications or custom developed applications they use on a day-to-day basis. Regardless of whether these forms are thin client (web or browser) based or thick/smart client (windows forms) based, the information worker's ability to add additional information on-demand to existing forms based on its current state and context, is extremely limited. Existing form technologies depend on a developer's involvement to bind the form to a data source (web service, database, etc) which populates the form with information based on a user event (click of a button, etc). Should the end user require additional information to be displayed on the form, he needs to rely on application specific pre-developed functionality that might allow him to see additional information or data fields on the forms. This implementation however depends on the logic encapsulated in the application or custom developed solution.

Still further, existing process automation tools do not provide the necessary level of modeling tools and concepts to allow both technical and non-technical users to author a completed business process solution in a single modeling/automation tooling environment. It is extremely difficult for business analysts, business/process owner's technical people to use a single solution which allows for all roles to work seamlessly together to rapidly discover, model and automate business processes within organizations. Existing workflow and business process automation tools are disconnected and do not allow for a single environment which brings technical and non-technical business users together with a set of tools that deeply integrate the necessary building blocks.

SUMMARY

The disclosed system uses Enterprise Application Integration (EAI) sources (e.g., EAI software, Web Services, Application API) to provide a higher level framework (e.g., runtime broker and adapter services) with related solution components (e.g., user interfaces and tooling) which empowers technical and non-technical users to author logical business objects that include data definitions (e.g., customer name, surname, etc) and actions or methods (e.g., save, load, delete) from existing and/or new data sources. Existing data sources include ERP, CRM, and/or custom developed systems in an organization. New data sources are created and maintained by the disclosed system. The system allows users to combine data from multiple sources into one single business object definition, including data and method/actions definitions. The new logical business object exposes a single logical data structure and view of the object as well as a single set of logical methods that are associated with the object. For example, the logical business object may implement standard SQL methods such as INSERT, UPDATE, SELECT, DELETE, etc. The methods may act as stored procedures to external interfaces and can take parameters to manipulate the data result sets. For example, the INSERT method may take a number of parameters for the INSERT operation to execute.

The object broker interprets the new object definition and brokers data/information and method calls to the data sources (or existing systems). Additional fields can be added to the new object definition. These additional fields are associated with unique identifiers from the other data sources included in the new object definition. Data structures and actions (e.g., insert, update, select, delete as examples) are managed by the object broker. The actual data is stored in native format of the data store it originates in and is not duplicated. The object broker creates a dynamic business object whose definition can be changed by either adding or removing data or actions without the need to involve technical or development resources to reconfigure or recompile the actual objects.

Existing systems are accessed through a service object component. The service object for a specific back-end system implements the base interface expected by the object broker. This enables the object broker to use a consistent communication mechanism to exchange data and function calls with the applications it is integrating. The object broker, together with the service object interface, provides the underlying infrastructure to exchange data, method calls and participation in supporting services such as transactions, compensations models, exception handling and role/security management. The object broker also includes a single-sign on implementation, which allows the object broker to use a single credential set to access multiple systems (each with their own authentication model).

The disclosed system also facilitates the creation of automated business processes by both technical and non-technical users. Business process design typically utilizes two main elements of information that are part of the design time and run time process information, the process instance data, or the actions that were taken in the process, and the object data that is associated with the process instance. The object data that is used in a business process may be represented by the logical business objects. By abstracting the business process data as logical business objects, the system allows the user to access or alter the information without needing to write code or complex database queries. The logical business objects associated with a business process can be edited and created in a similar manner to all other logical business objects.

Additional features and advantages are described herein, and will be apparent from, the following Detailed Description and the figures.

BRIEF DESCRIPTION OF THE FIGURES

FIG. 12 is an example screenshot of a workflow process overview report screen.

FIG. 13 is an example screenshot of a process instances report screen.

DETAILED DESCRIPTION

Figure 1:
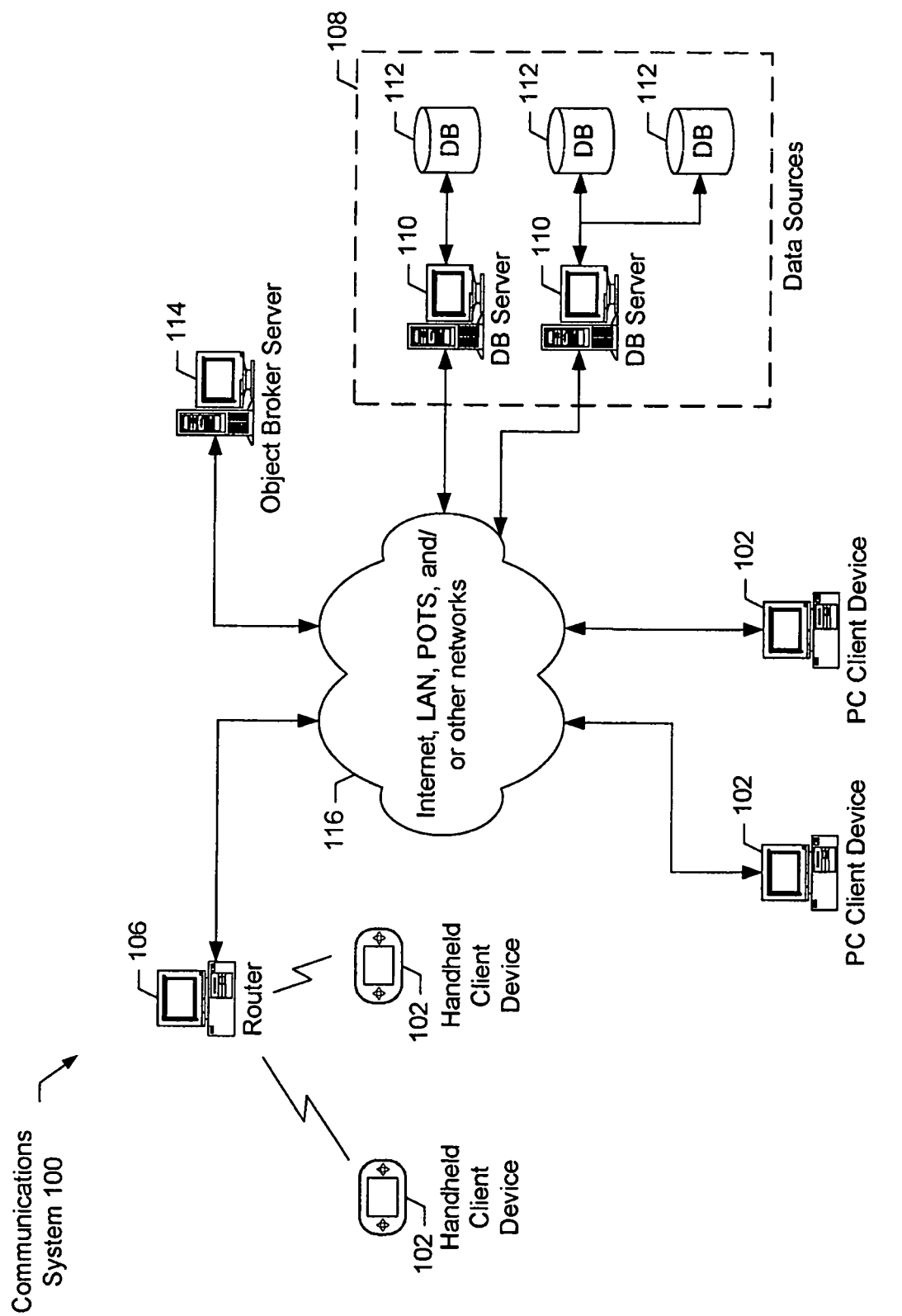
FIG. 1 is a high level block diagram of a communications system.

The present system is most readily realized in a network communications system. A high level block diagram of an exemplary network communications system 100 is illustrated in FIG. 1. The illustrated system 100 includes one or more client devices 102, one or more routers 106, and a plurality of different data sources 108 including database servers 110 and/or databases 112. Data transferred to/from the client devices 102 from/to the data sources 108 is managed by one or more object broker servers 114. Each of these devices may communicate with each other via a connection to one or more communications channels 116 such as the Internet and/or some other data network, including, but not limited to, any suitable wide area network or local area network. It will be appreciated that any of the devices described herein may be directly connected to each other instead of over a network.

The data sources 108 store a plurality of files, programs, and/or web pages in one or more databases 112 for use by the client devices 102. For example, a data source may store customer information. The data sources 108 may be connected directly to a database server 110 and/or via one or more network connections.

One data source 108 and/or one object broker server 114 may interact with a large number of other devices. Accordingly, each data source 108 and/or one object broker server 114 is typically a high end computer with a large storage capacity, one or more fast microprocessors, and one or more high speed network connections. Conversely, relative to a typical server, each client device 102 typically includes less storage capacity, a single microprocessor, and a single network connection.

Figure 2:
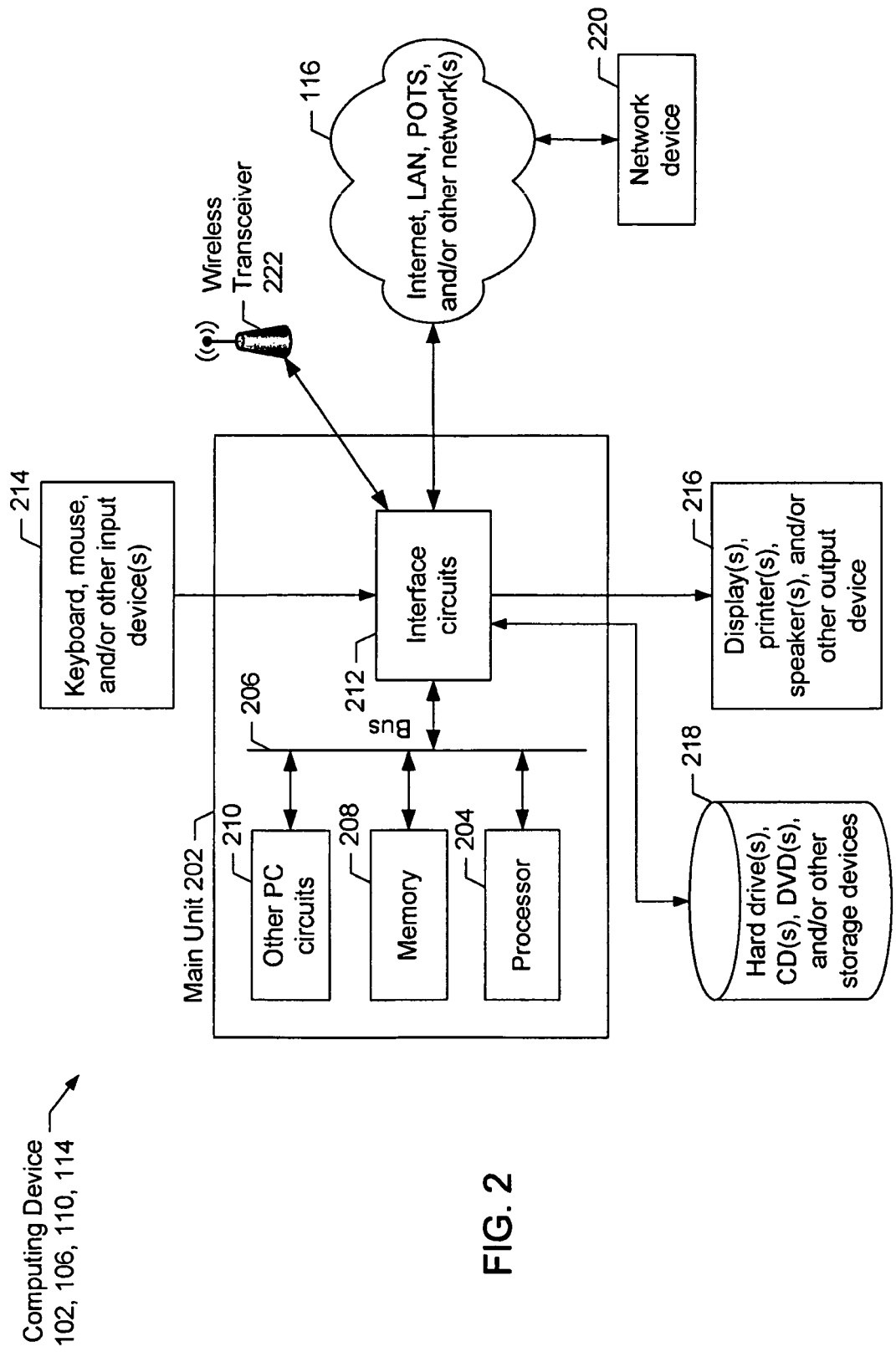
FIG. 2 is a more detailed block diagram showing one example of a computing device.

A more detailed block diagram of the electrical systems of a computing device (e.g., handheld client device 102, personal computer client device 102, router 106, database server 110, and/or object broker server 114) is illustrated in FIG. 2. Although the electrical systems of these computing devices may be similar, the structural differences between these devices are well known. For example, a typical handheld client device 102 is small and lightweight compared to a typical database server 110.

The example computing device 102, 106, 110, 114 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from another computing device and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the computing device 102, 106, 110, 114. For example, the display 216 may be used to display web pages received from the object broker server 114 including data from multiple data sources 108. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of suitable data.

The computing device 102, 104 may also exchange data with other network devices 220 via a connection to the network 116. The network connection may be any type of network connection, such as an Ethernet connection, digital subscriber line (DSL), telephone line, coaxial cable, etc. Users of the system 100 may be required to register with one or more of the computing devices 102, 106, 110, 114. In such an instance, each user may choose a user identifier (e.g., e-mail address) and a password which may be required for the activation of services. The user identifier and password may be passed across the network 116 using encryption built into the user's web browser. Alternatively, the user identifier and/or password may be assigned by the computing device 102, 106, 110, 114.

Figure 3:
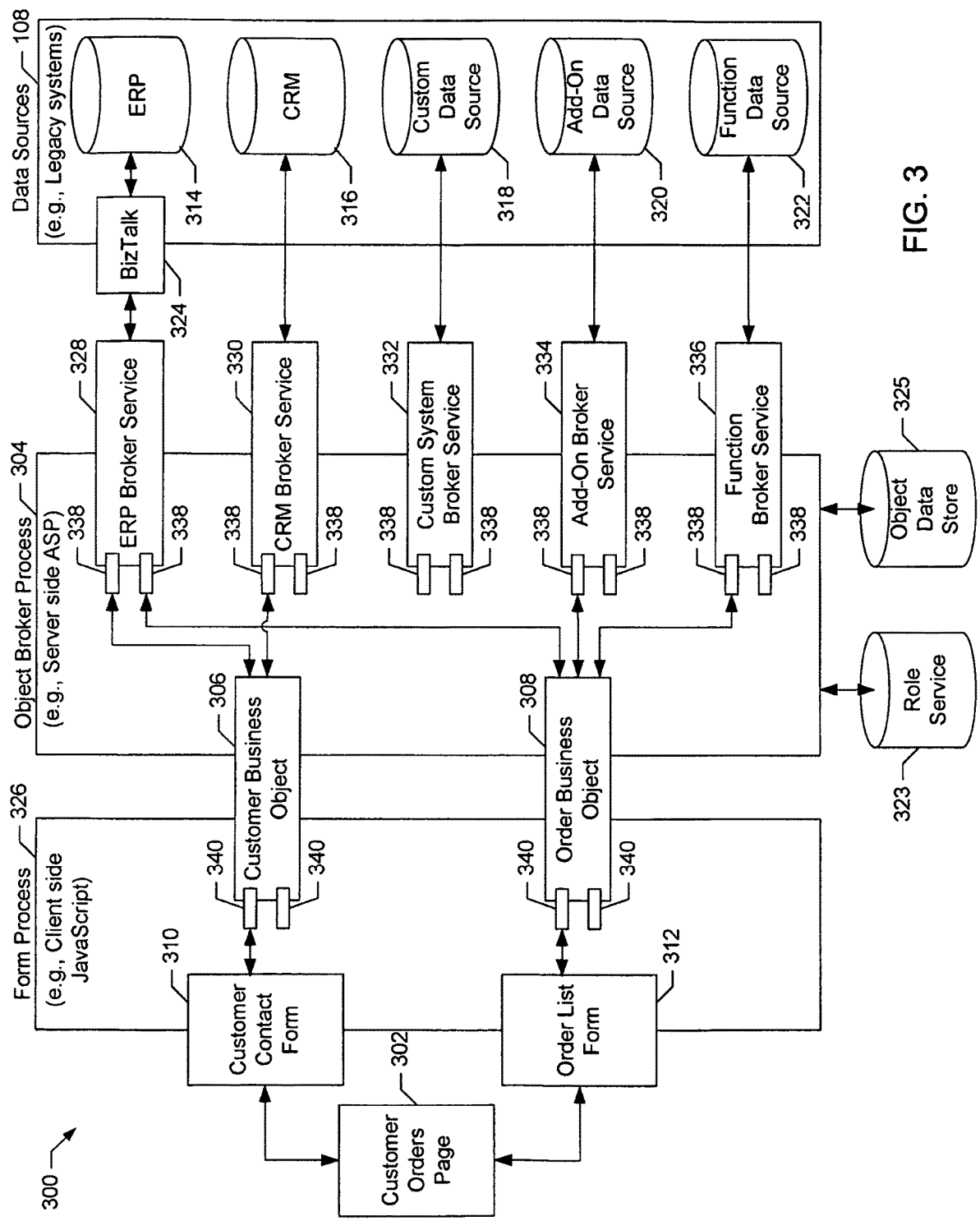
FIG. 3 is a block diagram showing example connections between a plurality of data sources and an electronic form via an object broker.

In one embodiment, a user at a client device 102 views and/or modifies data from a plurality of different data sources 108 via an interactive electronic form. An example block diagram showing connections between a plurality of data sources 108 and an electronic form 302 via an object broker process 304 is illustrated in FIG. 3. In general, the object broker process 304 (described in detail below with reference to FIG. 6) compiles data in a variety of different native formats from the different data sources 108 (e.g., different legacy database systems) into standardized business objects 306, 308 (e.g., in a declarative format such as XML). A user may then view the data using one or more electronic forms 302, 310, 312. In addition, the user may manipulate the data and/or add data via the electronic forms 302, 310, 312. When form data is changed, the object broker process 304 accepts the data via the business objects 306, 308 and stores the data back to the data sources 108 in the correct native format.

In this example, the data sources 108 include an enterprise resource planning (ERP) data source 314, a customer relationship management (CRM) data source 316, a custom data source 318, an add-on data source 320, and a function data source 322. In addition, a role service 323 and an object data store 325 are included in the system 300. Typically, an ERP data source 314 stores data related to accounts receivable, accounts payable, inventory, etc. Typically, a CRM data source 316 stores data related to leads, quotes, orders, etc. A custom data source 318 is a data source 108 that is not considered a standard commercial product. For example, a business may have a custom data source that stores real-time manufacturing information. Some data sources 108 may use an intermediary server for communications. For example, the ERP data source 314 may use a BizTalk server 324.

The add-on data source 320 stores data associated with form fields added by the user that are not supported by one of the other data sources 108. For example, a business may start up a frequent shopper card program and need to store a card number for each participant. Accordingly, a user may add a frequent buyer number field to an existing form containing legacy data. Because the existing data sources 108 in this example do not include a frequent buyer number field, the frequent buyer number field and associated data are stored by the add-on data source 320.

In order to manipulate data in a particular data source 108, the object broker process 304 preferably calls methods built into the associated data source 108. For example, each data source 108 typically includes methods to store/retrieve data to/from the data source 108 (e.g., the CRM data source may support a "LoadContact" method as described in detail below). In addition, the system 300 allows a user to author their own functions. For example, a user may need to apply a discount to certain customers. However, the existing data sources 108 may not include a method to calculate the discount. Accordingly, the user may author a "CalcDiscount" function as described below. User defined functions may use data from more than one data source 108. The definitions for these user defined functions is then stored in the function data source 322.

User defined functions may be created using a graphical user interface tool. For example, parameters for a user defined function may be defined by selecting a graphical representation of the parameter associated with a business object. Preferably, user defined functions are stored as snippets. Snippets include a structure portion that defines the function and a user interface portion that provides the user a way to test the function. For example, the structure portion may be stored as XML, and the user interface portion may be stored as HTML in the same file.

Some user defined functions may be executed by the client devices 102 thereby reducing communication with the servers 110, 114. Other user defined functions may require server side execution. Preferably, a determination is made if a particular function is to be executed on the client side or on the server side, and an indicator of this determination is stored with the function snippet. For example, user defined functions built from certain predefined primitives (e.g., add, multiply, loop, less than, etc.) may be determined to be executable by the client device 200, while other user defined functions that include database lookups (e.g., SQL statements) may be determined to be executable by a server 110, 114.

From a user's perspective, the data from the data sources 108 (as well as data calculated from data in the data sources 108 e.g., a discount) is viewed using one or more electronic forms 302, 310, 312. In addition, the user may manipulate the data and/or add data via the electronic forms 302, 310, 312. Forms 302, 310, 312 may be combined into pages 302 and one form may use data from more than one data source 108. For example, the customer orders page 302 combines the customer contact form 310 and the order list form 312 (as described in detail below with reference to FIG. 5). In addition, portions of forms and/or entire forms that are part of a larger page, may be locked so that only certain users can modify that portion of the form or page.

In order to facilitate forms 302, 310, 312 that combine data from different data sources 108, the system 300 employs an object broker process 304 and a form process 326. In one embodiment, the object broker process 304 is ASP code running on the object broker server 114 and the form process 326 is JavaScript running on a client device 102. The object broker process 304 compiles data in a variety of different native formats from the different data sources 108 into standardized business objects 306, 308 (e.g., XML files). In addition, the object broker process 304 accepts the data via the business objects 306, 308 and stores the data back to the data sources 108 in the correct native format.

More specifically, the object broker process 304 uses a plurality of broker services to communicate with the data sources 108. Preferably, one broker service is used for each data source 108. In this example, the object broker process 304 includes an ERP broker service 328, a CRM broker service 330, a custom broker service 332, an add-on broker service 334, and a function broker service 336. Each broker service 328, 330, 332, 334, 336 is designed to communicate with the associated data source 108 using the data source's native formats and protocols.

Each broker service 328, 330, 332, 334, 336 then automatically exposes the properties and methods of the associated data source 108 as standardized properties and methods 338 for use by the business objects 306, 308. For example, the ERP broker service 328 communicates with the ERP data source 314 via the BizTalk server 324 and exposes the ERP data source 314 properties and methods to the customer business object 306 and the order business object 308 as XML files. If new properties and/or methods become available from a data source 108, the associated broker service preferably detects these new properties and/or methods and automatically exposes the new properties and/or methods for use by the business objects 306, 308. The business objects 306, 308 may include some or all of the exposed properties and methods 338. Each business object 306, 308 then exposes its included properties and methods 340 to the form process 326.

The form process 326 calls business object methods 340 in response to form events and populates the forms 302, 310, 312 with data from the business object properties 340. For example, a user may press a "Load" button on the customer orders page 302, which causes the form process 326 to call one or more methods 340 exposed by the business objects 306, 308. This, in turn, causes the object broker process 304 to retrieve the appropriate data from one or more data sources 108. The data is then returned as properties of the business objects 306, 308, and the form process 326 uses the data to populate the forms 310, 312.

In addition, the form process 326 may store values to the business object properties 340, and call methods to have the new/modified data stored back to the appropriate data source 108 via the object broker process 304. For example, a from may accept a new value for a customer's address and call an UpdateContact method to have the new address stored to the appropriate data source 108. The form allows the user to update the customer's address without knowledge of the underlying data source 108.

The form process may 326 may call methods that implement standard SQL methods such as INSERT, UPDATE, SELECT, DELETE, etc. The methods act as stored procedures to external interfaces and can take parameters to manipulate the data result sets. For example, the INSERT method may take a number of parameters for the INSERT operation to execute.

Additionally, a business object may represent data associated with a business process. For example, a business process data surfacing module on the object broker server may create a business object exposing the business process data as a standard database construct. The business process data surfacing module may take a business process and create a business object entity wrapper encapsulating the business process data as well as business process objects in a single entity.

By exposing a business process as a business object with standard database operations, the business process user is able to perform functions on the workflow process such as reporting or building client applications.

Figure 4:
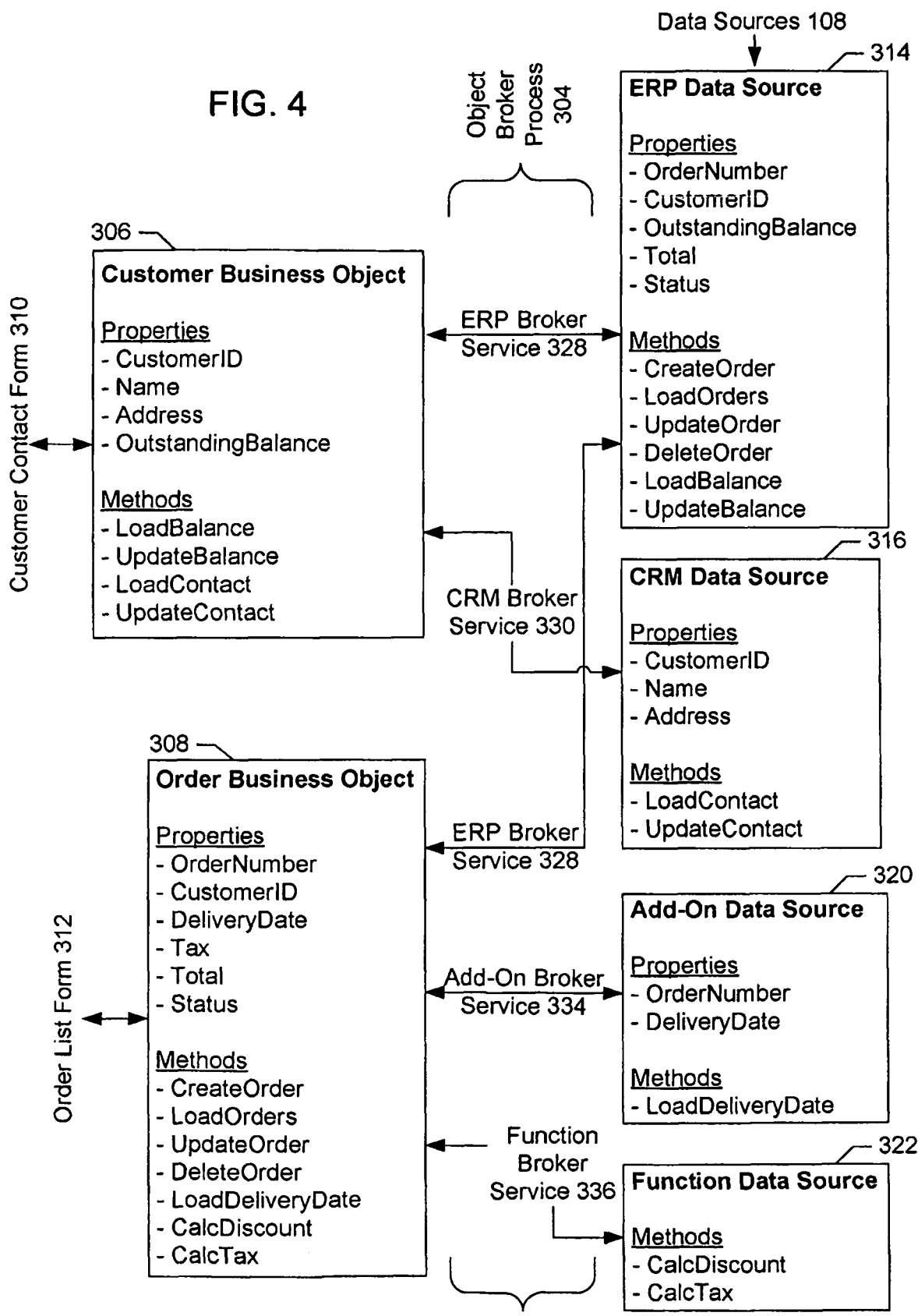
FIG. 4 is a block diagram showing example connections between data sources and business objects.

A more detailed block diagram showing these connections between the example data sources 108 and the example business objects 306, 308 is illustrated in FIG. 4. In this example, the customer business object 306 is connected to the ERP data source 314 and the CRM data source 316. The order business object 308 is connected to the ERP data source 314, the add-on data source 320, and the function data source 322. These logical connections may be defined in any suitable manner. For example, a graphical user interface may be used to allow a user to draw connection lines between graphical representations of the data sources 108 and graphical representations of the business objects 306, 308.

These logical connections are maintained by the object broker process 304. For example, data to populate the customer contact form 310 and the order list form 312 may be brought into the customer business object 306 and the order business object 308 from the data sources 108 by the object broker process 304. Similarly, new and modified data from the customer contact form 310 and the order list form 312 may be sent from the customer business object 306 and the order business object 308 to the data sources 108 by the object broker process 304. In addition, the role service 323 may generate a reduced object definition based on these full object definitions. For example, the role service 323 may retrieve a role associated with a particular user and a plurality of authorized properties and/or methods associated with that role. Unauthorized properties and/or methods are then removed from the business object definition (e.g., a particular user is not allowed to write to the customer business object, therefore the UpdateBalance and UpdateContact methods are removed).

The example customer business object 306 includes a customer ID property, a name property, an address property, an outstanding balance property, a load balance method, an update balance method, a load contact method, and an update contact method. The customer ID property in the customer business object 306 is connected to the customer ID property in the ERP data source 314 and/or the customer ID property in the CRM data source 316. The name property and the address property in the customer business object 306 are connected to the name property and the address property in the CRM data source 316. The outstanding balance property in the customer business object 306 is connected to the outstanding balance property in the ERP data source 314. The load balance method and the update balance method in the customer business object 306 are connected to the load balance method and the update balance method in the ERP data source 314. The load contact method and the update contact method in the customer business object 306 are connected to the load contact method and the update contact method in the CRM data source 316.

The example order business object 308 includes an order number property, a customer ID property, a delivery date property, a tax property, a total property, a status property, a create order method, a load orders method, an update order method, a delete order method, a calc discount method, and a calc tax method. The order number property and the status property in the order business object 308 are connected to the order number property and the status property in the ERP data source 314. The customer ID property in the order business object 308 is connected to the customer ID property in the ERP data source 314 and/or the customer ID property in the add-on data source 320. The delivery date property, tax property, and total property in the order business object 308 are connected to the delivery date property, tax property, and total property in the add-on data source 320. The create order method, load orders method, update orders method, and delete order method in the order business object 308 are connected to the create order method, load orders method, update orders method, and delete order method in the ERP data source 314. The calc discount method and the calc tax method in the order business object 308 are connected to the calc discount method and the calc tax method in the function data source 322. It will be appreciated that the names of the properties and/or methods in the data sources 108 need not be the same as the corresponding names of the properties and/or methods in the business objects 306, 308.

Figure 5:
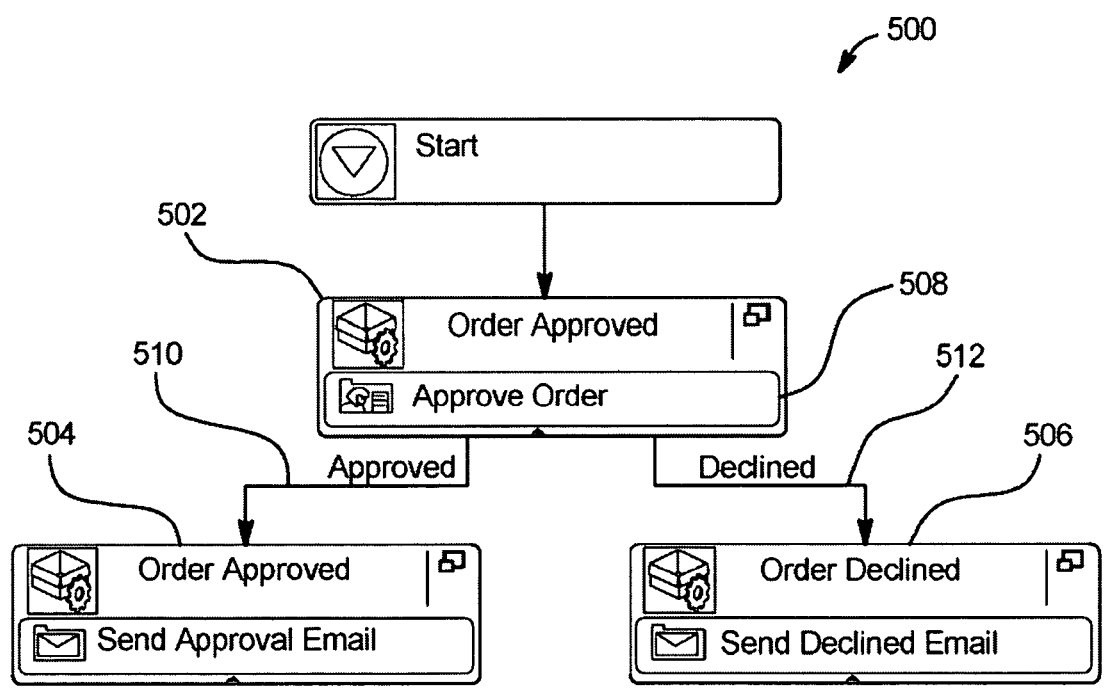
FIG. 5 is a screenshot of an example business process.

A screenshot of an example process is presented in FIG. 5. Although the example process is described in reference FIG. 5, it will be appreciated that many other configurations are possible. For example, elements could be in different locations, elements could have different names, and elements could have different graphical representations.

Most processes consist of a number of activities and events. Some events may require input from a user and are called events. Other events can be executed without any user interaction and are called server events. Process 500 has three activities, Order Approval 502, Order Approved 504 and Order Declined 506. Activities may have associated events. For example, the Order Approval 502 activity has an associated event Approve Order 508. Events are categorized based on the entity that performs the event, for example, the Approve Order 508 event is an event.

Events may have actions. For example, the Approve Order 508 event has actions "Approved" 510 and "Declined" 512. As with business processes, activities can have data associated with the scope of that activity. For example, the Approve Order 508 event may have an "Order ID" that is defined as data at the process level.

When a process is deployed, logical business objects ("business entities") may be created for the process itself and for each event in the process. For example, when deployed, process 500 may have a business object created for the process 500 and for the Approve Order 508 event.

Figure 6:
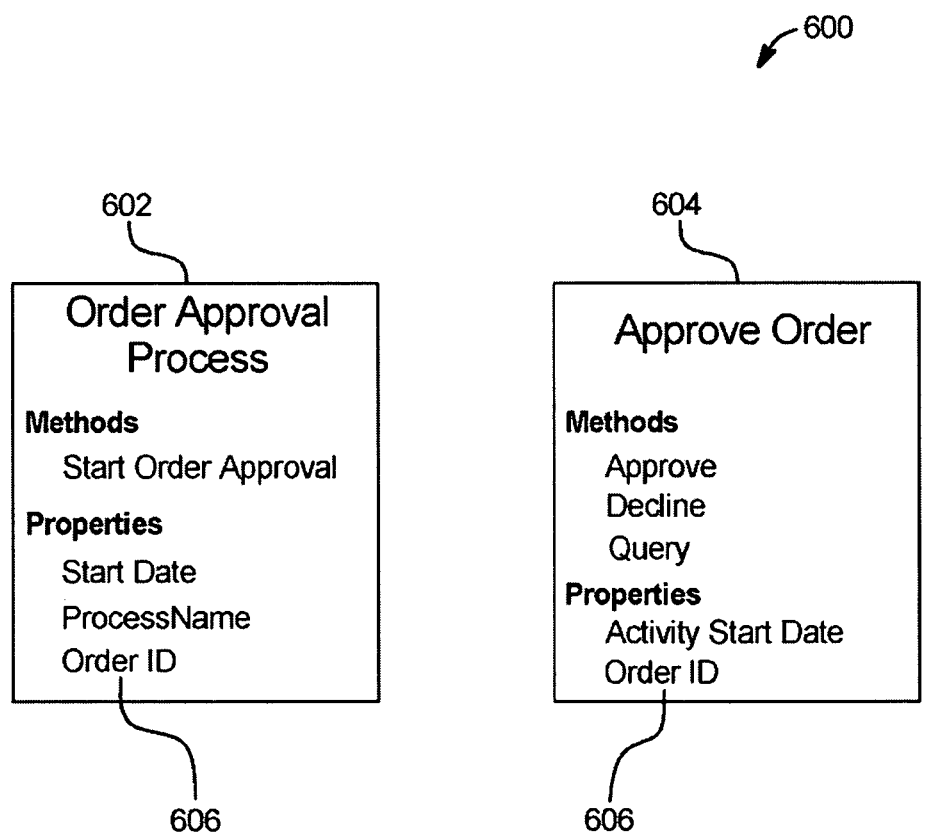
FIG. 6 is a screenshot of an example business object model.

A screenshot of an example business object model is presented in FIG. 6. Although the example business object model is presented in reference FIG. 6, it will be appreciated that many other configurations are possible. For example, elements could be in different locations, elements could have different names, and elements could have different graphical representations.

If data is defined on the business process level, that data may become a property for all business entities (e.g., the process business object and the event business entities). For example, if "Order ID" is defined as data on the process level, it may become an "Order ID" property 606 in the Order Approval Process Business object 602 and the Approve Order Business object 604, where the Order Approval Process Business object 602 is associated with the overall business process and the Approve Order Business object 604 is associated with the Approve Order event 508.

Figure 7:
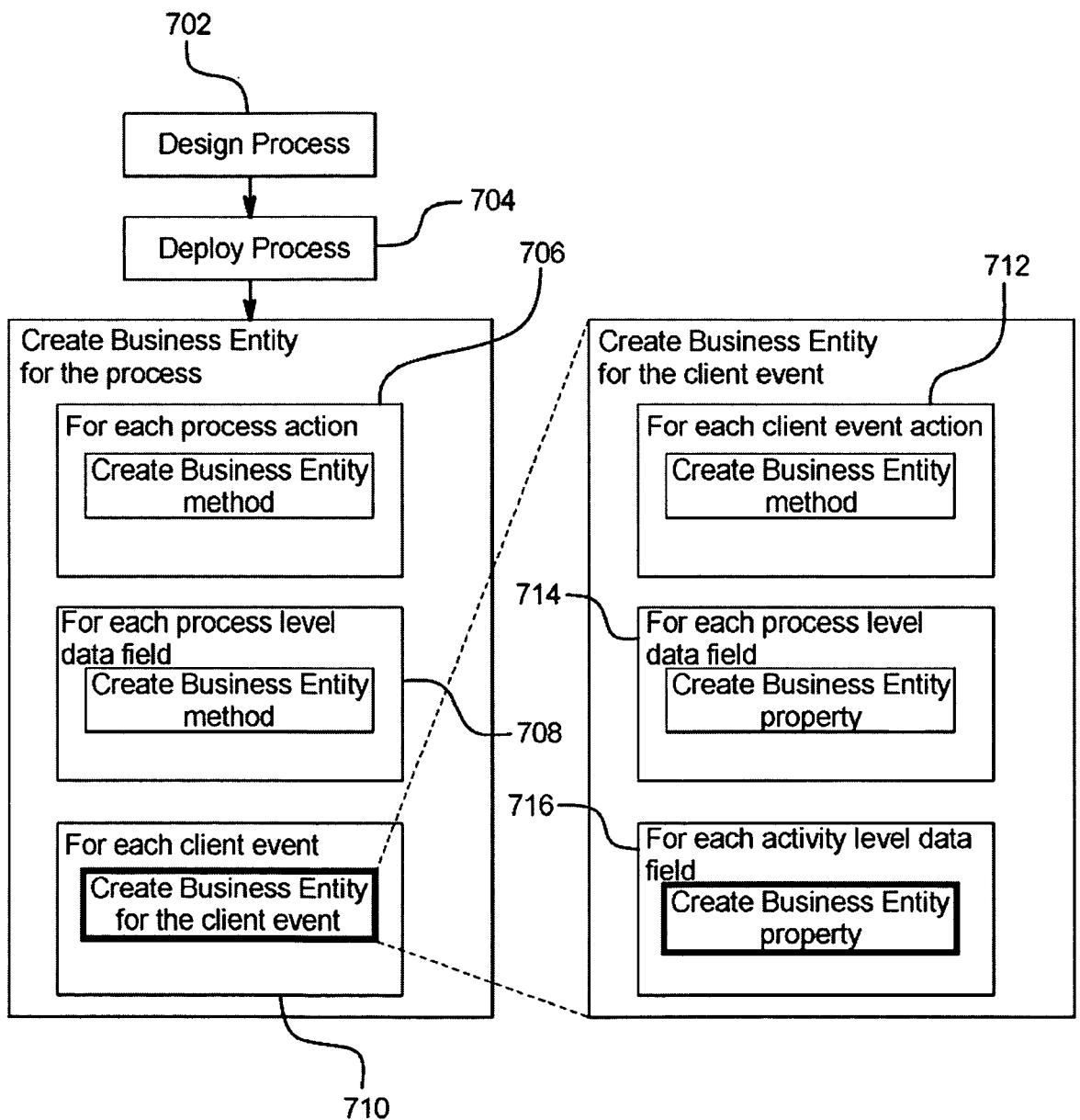
FIG. 7 is a screenshot of an example data flow model.

A screenshot of an example data flow model is presented in FIG. 7. Although the example data flow model is presented in reference FIG. 7, it will be appreciated that many other configurations are possible. For example, elements could be in different locations, elements could have different names, and elements could have different graphical representations.

The data flow may begin with the design process (block 702). For example, required data may be identified during the initial design of the business process. The data flow may then continue to the deploy process (block 704). For example, at runtime the required data may be determined.

A business object method may be created for each process action (block 706). For example, each business process action a business object method may be created. The Order Approval Process Business object 602 may have a Start Order Approval method created for the Start Approval activity, as seen in FIG. 6. For each process level data field a property of the business object may be created (block 708).

For example, if "Order ID" was set to a business process level data field, an "Order ID" property may be created for the business object.

A business object may be created for each event as well (block 710). For example, an Approve Order 508 event may have its own business object created for it. As with the business process business object, each event action may have a business object method created (block 712). Each process level data field may be a business object property (block 714), and each activity level data field may be a business object property (block 716). For example, in the Approve Order Business object 604, a process level data field may be "Order ID" and an activity level data field may be "Activity Start Date" which is localized to the event business object.

Figure 8:
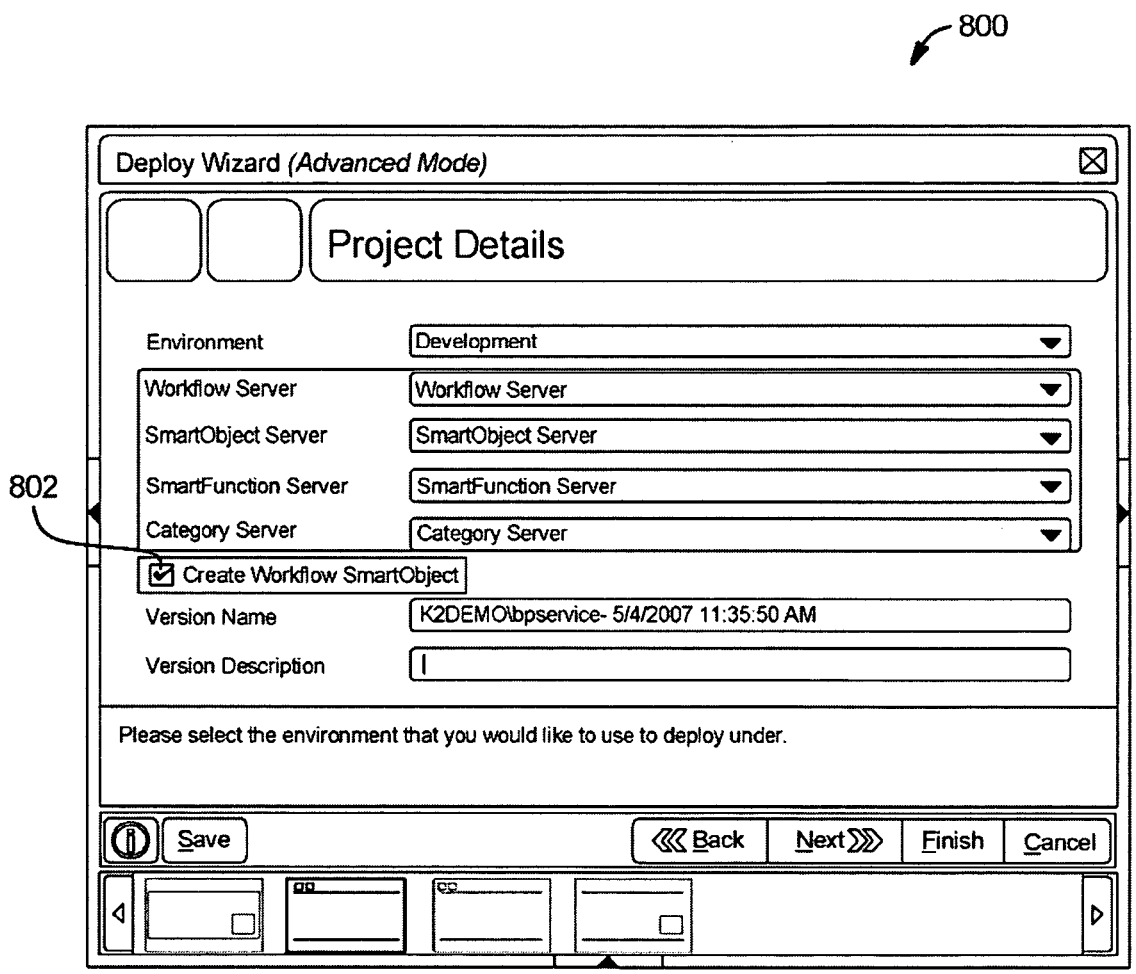
FIG. 8 is a screenshot of an example deployment screen.

A screenshot of an example deployment screen is presented in FIG. 8. Although the deployment screen is presented in reference FIG. 8, it will be appreciated that many other configurations are possible. For example, elements could be in different locations, elements could have different names, and elements could have different graphical representations.

When the process is deployed, the user may be given a choice to generate business entities during the deployment of the process or to generate the business entities manually after deployment. For example, the user may be presented with an option 802 to create the business object, or "Workflow SmartObject."

Figure 9:
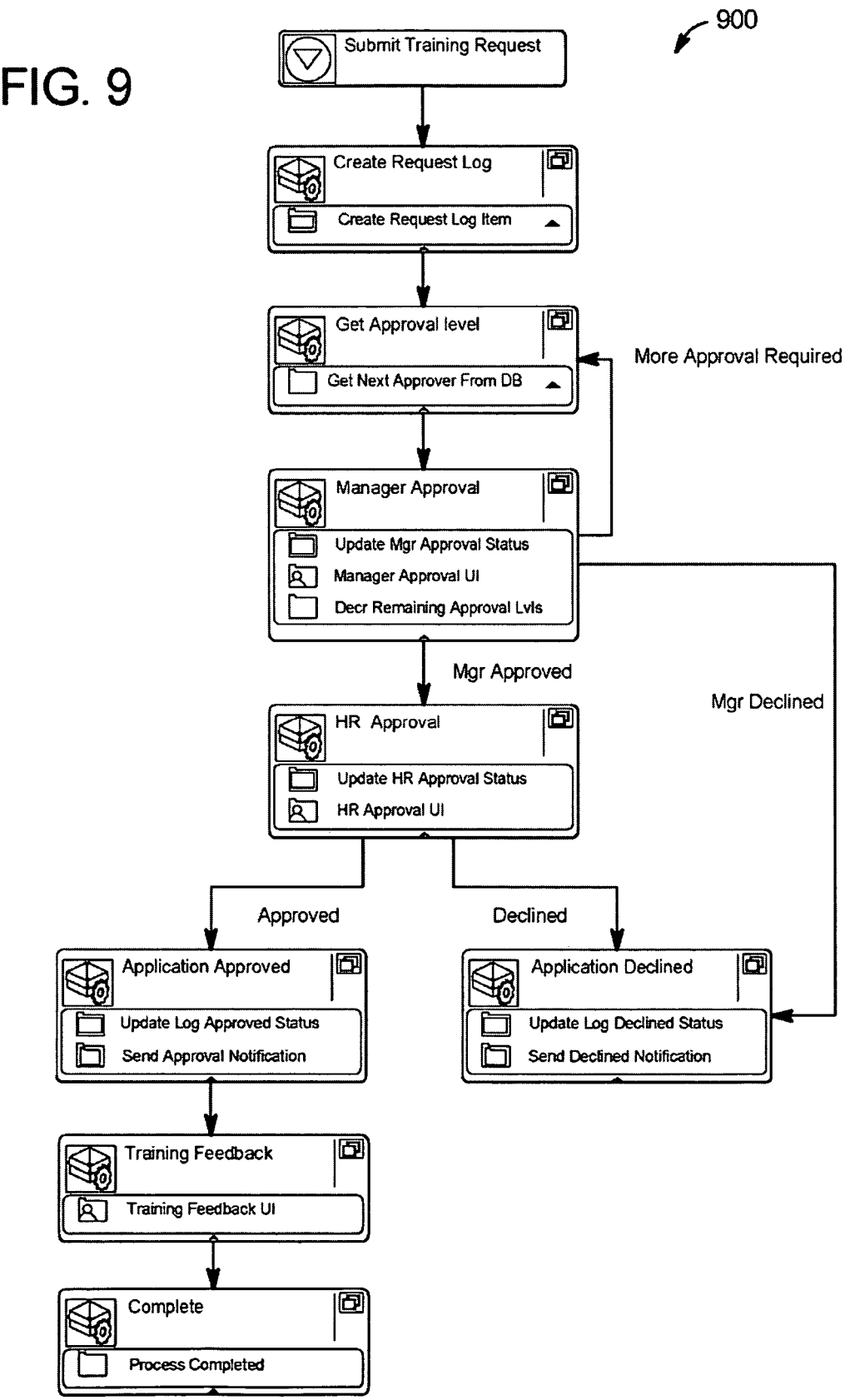
FIG. 9 is an example screenshot of a workflow screen.

A screenshot of an example workflow screen 900 is presented in FIG. 9. Although the example workflow screen 900 is described in reference FIG. 9, it will be appreciated that many other configurations are possible. For example, elements could be in different locations, elements could have different names, and elements could have different graphical representations.

The workflow screen 900 may contain a workflow object, or a plurality of workflow objects, such as tasks, events, activities, etc. The workflow may be stored in the data sources 108.

Figure 10:
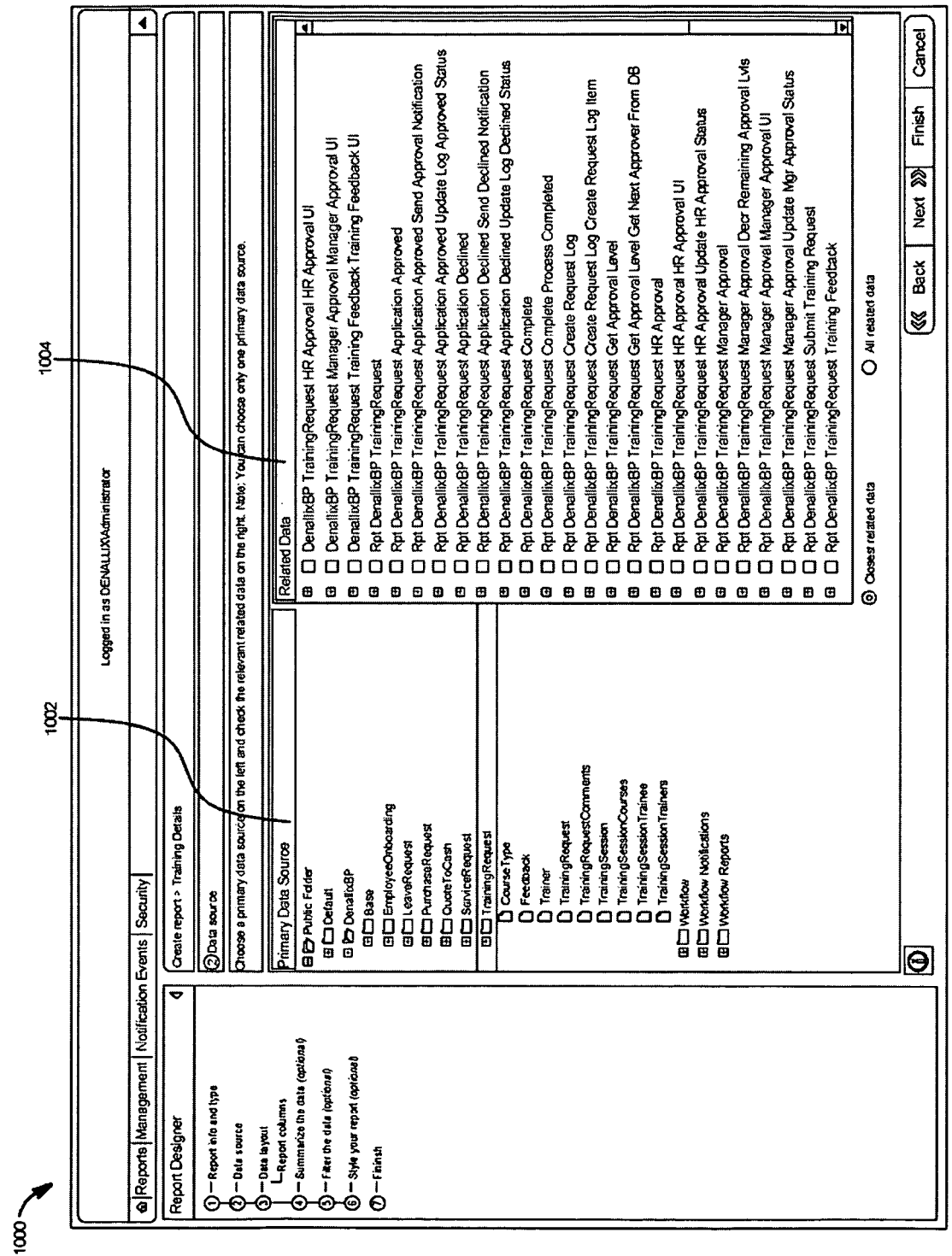
FIG. 10 is an example screenshot of a business entity selection screen.

A screenshot of an example business entity selection screen 1000 is presented in FIG. 10. Although the example business entity selection screen 1000 is described in reference FIG. 10, it will be appreciated that many other configurations are possible. For example, elements could be in different locations, elements could have different names, and elements could have different graphical representations.

The business entity selection screen 1000 may be based on workflow processes stored in the data sources 108. The business entity selection screen 1000 may have a business entity listing 1002. The business entity listing 1002 shows all available business processes. The business entity selection screen 1000 may also have a related data window 1004. The related data window shows data from the business entity that is selected on the business entity listing 1002 as well as any related business entities. For example, a workflow process, represented as a Business object, may make use of other business objects as part of the business process. A workflow process that deals with Customer information may have an associated business object for a Customer that has read/write interactions throughout the business process runtime. The associated business object will also be presented in the related data window 1004 and be available for reporting and external client application access. Since all business objects can be represented as standard database constructs, the business user is not limited to just working with workflow data.

Figure 11:
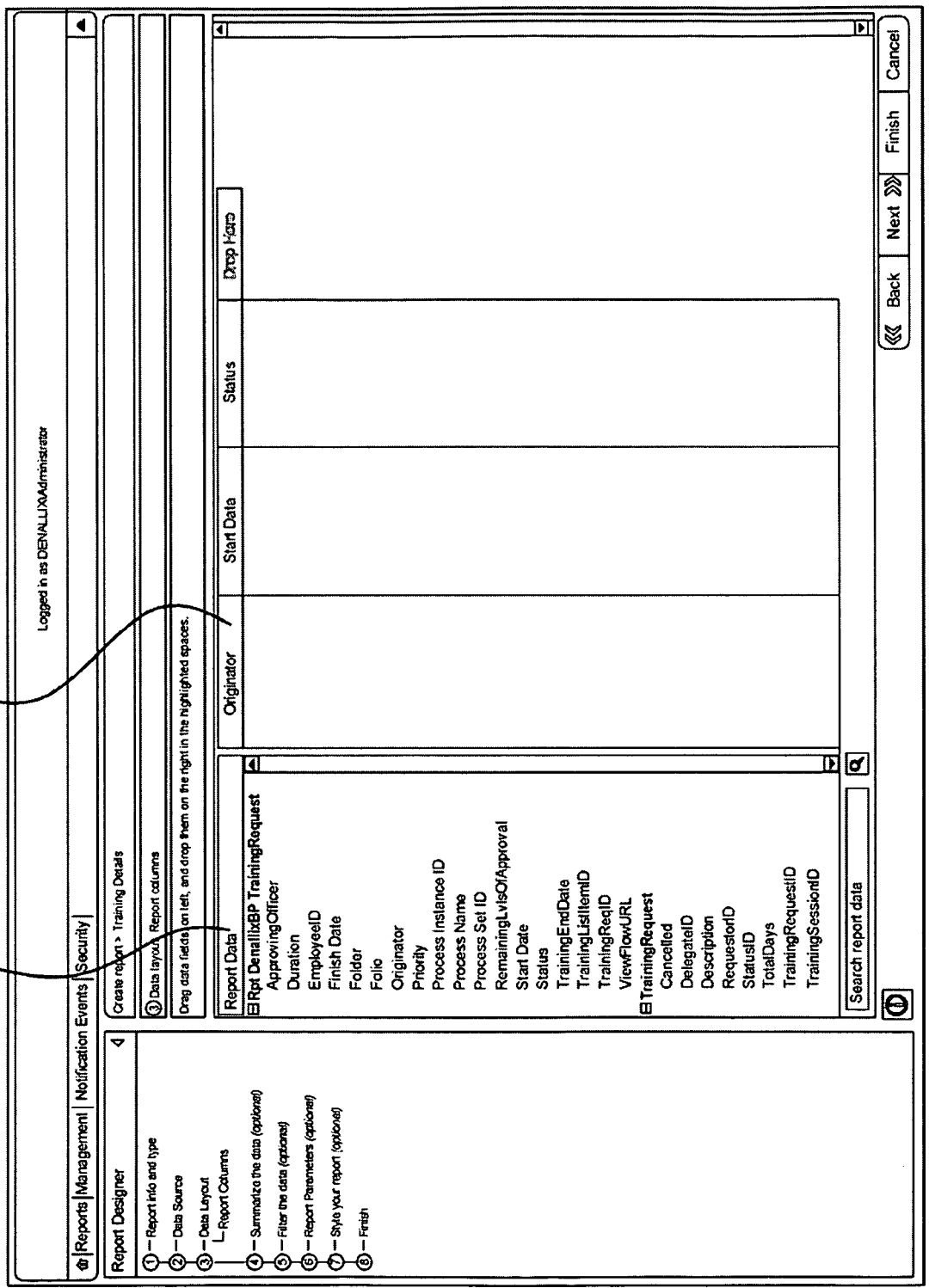
FIG. 11 is an example screenshot of a data selection screen.

A screenshot of an example data selection screen 1100 is presented in FIG. 11. Although the example data selection screen 1100 is described in reference FIG. 11, it will be appreciated that many other configurations are possible. For example, elements could be in different locations, elements could have different names, and elements could have different graphical representations.

The data selection screen 1100 allows the user to select specific data elements to report on. The data selection screen 1100 may include report data listing 1102 and reporting window 1104. By using the data selection screen 1100, the user can create detailed reports on the data that the user wishes to monitor. The data selection screen 1100 provides a front end interface to the business entities and an interface for performing database operations on the business entities.

A screenshot of an example workflow process overview screen 1200 is presented in FIG. 12. Although the example workflow process overview screen 700 is described in reference FIG. 12, it will be appreciated that many other configurations are possible. For example, elements could be in different locations, elements could have different names, and elements could have different graphical representations.

The workflow process overview screen 1200 contains a workflow process listing 1202. The workflow process listing 1202 shows all of the running processes on an object broker server 114 or another server executing a business process.

A screenshot of an example process instances report screen 1300 is presented in FIG. 13. Although the example process instances report screen 1300 is described in reference FIG. 13, it will be appreciated that many other configurations are possible. For example, elements could be in different locations, elements could have different names, and elements could have different graphical representations.

The process instances report screen 1300 contains a workflow instance listing 802. The workflow instance listing 1302 shows all of the running instances of a given type of business entity. It will be appreciated that many other reports are possible. For example, Process and Activity detail reports.

Figure 14:
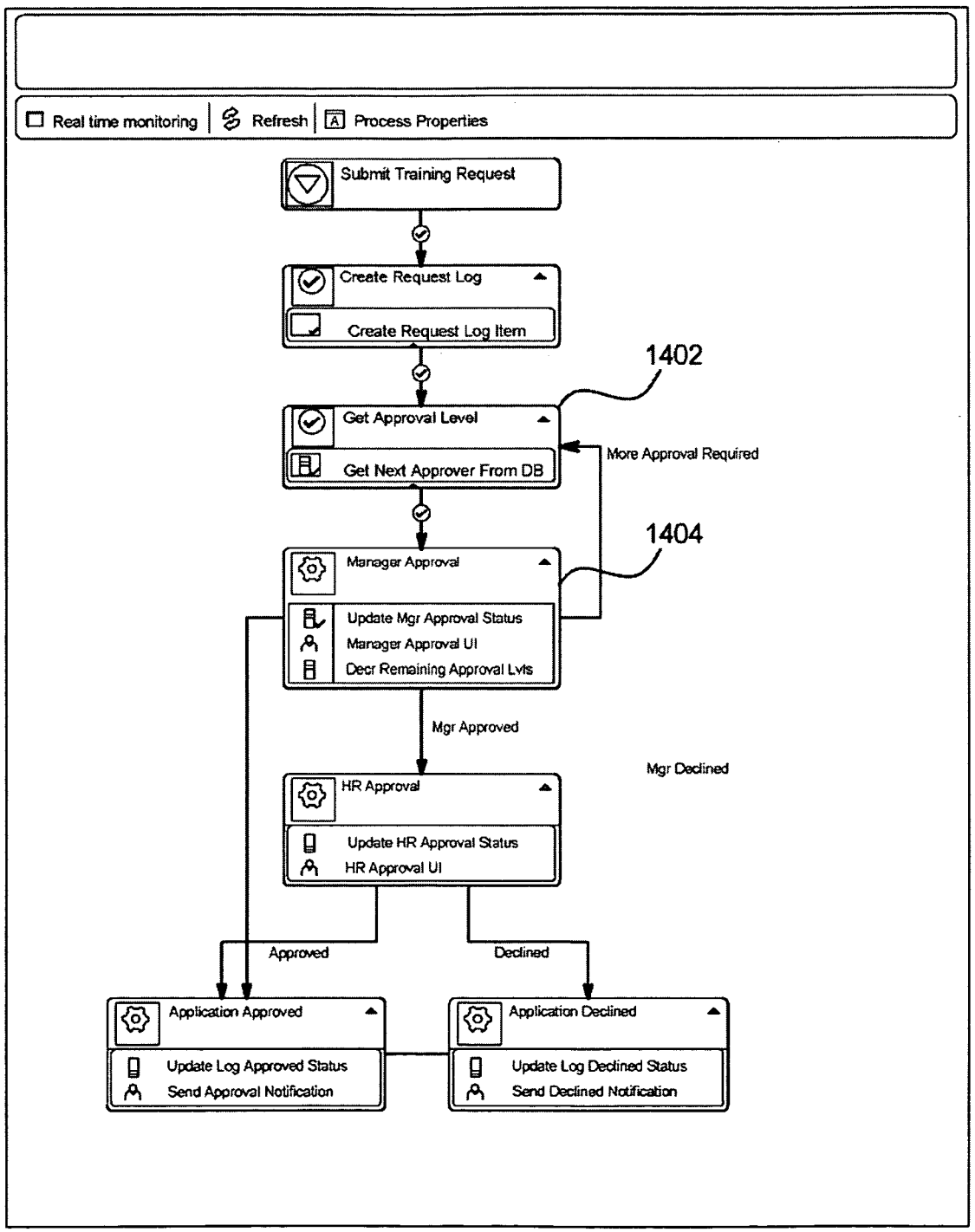
FIG. 14 is an example screenshot of a view flow report screen.

A screenshot of an example view flow screen 1400 is presented in FIG. 14. Although the example view flow screen 1400 is described in reference FIG. 14, it will be appreciated that many other configurations are possible. For example, elements could be in different locations, elements could have different names, and elements could have different graphical representations.

The view flow screen 1400 includes a workflow process view. The workflow process view may include colored workflow process objects 1402 showing completed process steps. The workflow process view may also include a colored workflow process object 1404 showing the current workflow process step. In this way, the user can determine where in the process the data is from. The view flow screen 1400 also allows the user to transition between the standardized database construct view and the workflow process view.

In summary, persons of ordinary skill in the art will readily appreciate that inventive methods and apparatus related to automated workflows and forms have been disclosed. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention is claimed as follows:

1. A method for exposing a workflow process definition as a business object, the method comprising:

receiving, via a processor from a client device, a request to create a business object;

after receiving the request, receiving, via the processor, data source information from broker services corresponding to available data sources, the data sources being configured on one or more memory devices for storing workflow data related to a business system, the data source information identifying data properties and methods associated with each of the data sources, each of the data properties and methods being individually selectable;

receiving, via the processor, information for creating a custom data source for storage of custom workflow data that is incompatible for storage with the workflow data that is stored in the data sources, the custom data source having custom data source information identifying a method that includes a method for performing an operation on the custom workflow data;

creating and storing, via the processor, the custom data source to a memory device;

creating, via the processor, a first graphical representation for specification of the business object and graphical representations for the data sources, each data source graphical representation including a list that displays the data properties and methods associated with the respective data source;

receiving, at the processor after creation of the first graphical representation for specification of the business object, a selection from the client device of a first data source and the custom data source, the selection made by a first connection line drawn from a selected data property of the selected first data source, among available data properties of the selected first data source, to the first graphical representation for specification of the business object, the first connection line providing an indication that the selected data property is to be used with workflow data received from the selected first data source for processing when the business object is executed, a second connection line drawn from a selected method of the selected first data source, among available methods of the selected first data source, to the first graphical representation for specification of the business object, the second connection line providing an indication that the selected method is to be used with the workflow data received from the selected first data source for processing when the business object is executed, and a third connection line drawn from the method of the selected custom data source to the first graphical representation for specification of the business object, the third connection line providing an indication that the selected method of the custom data source is to be used with the custom workflow data provided by the custom data source for processing when the business object is executed;

after the first, second, and third connection lines are drawn, configuring, via the processor, the business object with the selected data property and the selected method of the selected first data source, and the selected method of the custom data source such that the unselected available data properties and methods of the selected first data source are absent in the business object;

instructing, via the processor, a first selected broker service corresponding to the selected first data source to create at least one logical connection between the business object and the selected first data source for the selected data property and the selected method;

instructing, via the processor, a second selected broker service corresponding to the selected custom data source to create at least one logical connection between the business object and the selected custom data source for the associated method; and displaying, via the processor, the business object as a workflow process available for execution by at least one of the client device or the selected data source.

2. The method of claim 1, wherein the workflow data includes a first data from a first back end system and a second data from a second back end system.

3. The method of claim 1, wherein the selected method includes at least one of a Read, a Write, an Insert, an Update, a Select, and a Delete method.

4. The method of claim 1, including creating a report on the business object.

5. The method of claim 1, including retrieving the workflow data and an associated workflow process event from the business object.

6. The method of claim 1, including creating custom methods associated with the business object.

7. The method of claim 1, wherein the method of the custom data source creates new data when the business object is executed such that the new data is stored in the custom data source, wherein the new data is associated with a new data field created in the business object.

8. A system for exposing a workflow process definition as a business object, the system comprising:

a processor configured to:

receive from a client device, a request to create a business object;

after receiving the request, receive data source information from broker services corresponding to available data sources, the data sources being configured on one or more memory devices for storing workflow data related to a business system, the data source information identifying data properties and methods associated with each of the data sources, each of the data properties and methods being individually selectable;

receive information for creating a custom data source for storage of custom workflow data that is incompatible for storage with the workflow data that is stored in the data sources, the custom data source having custom data source information identifying a method for performing an operation on the custom workflow data;

create and store the custom data source to a memory device;

create a first graphical representation for specification of the business object and graphical representations for the data sources, each data source graphical representation including a list that displays the data properties and methods associated with the respective data source;

receive, after creation of the first graphical representation for specification of the business object, a selection from the client device of a first data source and the custom data source, the selection made by a first connection line drawn from a selected data property of the selected first data source, among available data properties of the selected first data source, to the first graphical representation for specification of the business object, the first connection line providing an indication that the selected data property is to be used with workflow data received from the selected first data source for processing when the business object is executed, a second connection line drawn from a selected method of the selected first data source, among available methods of the selected first data source, to the first graphical representation for specification of the business object, the second connection line providing an indication that the selected method is to be used with the workflow data received from the selected first data source for processing when the business object is executed, a third connection line drawn from the method of the selected custom data source to the first graphical representation for specification of the business object, the third connection line providing an indication that the selected method of the custom data source is to be used with the custom workflow data provided by the custom data source for processing when the business object is executed;

configure the business object with the selected data property and the selected method of the selected first data source, and the selected method of the custom data source such that the unselected available data properties and methods of the selected first data source are absent in the business object;

cause a first selected broker service corresponding to the selected first data source to create at least one logical connection between the business object and the selected first data source for the selected data property and the selected method; and cause a second selected broker service corresponding to the selected custom data source to create at least one logical connection between the business object and the selected custom data source for the associated method; and an interface configured to display the business object as a workflow process.

9. The system of claim 8, wherein the workflow data includes a first data from a first back end system and a second data from a second back end system.

10. The system of claim 8, wherein the selected method includes at least one of a Read, a Write, an Insert, an Update, a Select, and a Delete method.

11. The system of claim 8, including creating a report on the business object.

12. The system of claim 8, including retrieving the workflow data and an associated workflow process event from the business object.

13. The system of claim 8, including creating a custom method associated with the business object.

14. The system of claim 8, wherein the method of the custom data source creates new data when the business object is executed such that the new data is stored in the custom data source, wherein the new data is associated with a new data field created in the first business object.

15. A non-transitory computer readable medium storing a program causing a computer system to:

receive a request from a client device to create a business object;

after receiving the request, receive data source information from broker services corresponding to available data sources, the data sources being configured on one or more memory devices for storing workflow data related to a business system, the data source information identifying data properties and methods associated with each of the data sources, each of the data properties and methods being individually selectable;

receive information for creating a custom data source for storage of custom workflow data that is incompatible for storage with the workflow data that is stored in the data sources, the custom data source having custom data source information identifying a method for performing an operation on the custom workflow data;

create and store the custom data source to a memory device;

create a first graphical representation for specification of the business object and graphical representations for the data sources, each data source graphical representation including a list that displays the data properties and methods associated with the respective data source;

receive, after creation of the first graphical representation for specification of the business object, a selection from the client device of a first data source and the custom data source, the selection made by
- a first connection line drawn from a selected data property of the selected first data source, among available data properties of the selected first data source, to the first graphical representation for specification of the business object, the first connection line providing an indication that the selected data property is to be used with workflow data received from the selected first data source for processing when the business object is executed,
- a second connection line drawn from a selected method of the selected first data source, among available methods of the selected first data source, to the first graphical representation for specification of the business object, the second connection line providing an indication that the selected method is to be used with the workflow data received from the selected first data source for processing when the business object is executed, and
- a third connection line drawn from the method of the selected custom data source to the first graphical representation for specification of the business object, the third connection line providing an indication that the selected method of the custom data source is to be used with the custom workflow data provided by the custom data source for processing when the business object is executed;

configure the business object with the selected data property and the selected method of the selected first data source, and the selected method of the custom data source such that the unselected available data properties and methods of the selected first data source are absent in the business object;

instruct a first selected broker service corresponding to the selected first data source to create at least one logical connection between the business object and the selected first data source for the selected data property and the selected method;

instruct a second selected broker service corresponding to the selected custom data source to create at least one logical connection between the business object and the selected custom data source for the associated method; and display the business object as a workflow process.

16. The non-transitory computer readable medium of claim 15, wherein the workflow data includes a first data from a first back end system and a second data from a second back end system.

17. The non-transitory computer readable medium of claim 15, wherein the selected method includes at least one of a Read, a Write, an Insert, an Update, a Select, and a Delete method.

18. The non-transitory computer readable medium of claim 15, including creating a report on the business object.

19. The non-transitory computer readable medium of claim 15, including retrieving the workflow data and an associated workflow process event from the business object.

20. The non-transitory computer readable medium of claim 15, including creating a custom method associated with the business object.

21. The non-transitory computer readable medium of claim 15, wherein the method of the custom data source creates new data when the business object is executed such that the new data is stored in the custom data source,
wherein the new data is associated with a new data field created in the first business object.

* * * * *